(12) United States Patent
Murataka et al.

(10) Patent No.: US 7,724,986 B2
(45) Date of Patent: May 25, 2010

(54) IMAGE PROCESSOR, IMAGE PROCESSING METHOD, AND COMPUTER PRODUCT

(75) Inventors: Akira Murataka, Tokyo (JP); Hiroaki Fukuda, Kanagawa (JP); Hiroyuki Kawamoto, Kanagawa (JP); Isao Miyamoto, Kanagawa (JP); Satoshi Ohkawa, Tokyo (JP); Yasunobu Shirata, Tokyo (JP); Atsushi Togami, Kanagawa (JP); Fumio Yoshizawa, Chiba (JP); Shuji Kimura, Kanagawa (JP)

(73) Assignee: Ricoh Company Limited, Tokyo (JP)

( * ) Notice: Subject to any disclaimer, the term of this patent is extended or adjusted under 35 U.S.C. 154(b) by 659 days.

(21) Appl. No.: 11/219,909

(22) Filed: Sep. 7, 2005

(65) Prior Publication Data

US 2006/0061809 A1    Mar. 23, 2006

(30) Foreign Application Priority Data

Sep. 17, 2004   (JP) .............................. 2004-270847
Jul. 25, 2005    (JP) .............................. 2005-214786

(51) Int. Cl.
*G06K 9/54*   (2006.01)
*G06K 9/60*   (2006.01)
*G06K 1/00*   (2006.01)
*G06F 15/00*  (2006.01)
*G06F 3/12*   (2006.01)

(52) U.S. Cl. ...................... 382/307; 358/1.15; 358/1.13
(58) Field of Classification Search ................. 382/307, 382/100; 358/1.15, 1.13
See application file for complete search history.

(56) References Cited

U.S. PATENT DOCUMENTS

| | | | | |
|---|---|---|---|---|
| 6,466,329 | B1 * | 10/2002 | Mukai | 358/1.15 |
| 6,785,727 | B1 * | 8/2004 | Yamazaki | 709/229 |
| 6,876,825 | B2 * | 4/2005 | Kurahashi et al. | 399/82 |
| 6,981,134 | B2 * | 12/2005 | Yamamura | 713/1 |
| 7,372,592 | B2 | 5/2008 | Murakata | |
| 2004/0187092 | A1 * | 9/2004 | Fujiwara | 717/106 |
| 2004/0261074 | A1 * | 12/2004 | Murakata | 717/178 |

FOREIGN PATENT DOCUMENTS

| | | |
|---|---|---|
| JP | 2002-051220 | 2/2002 |
| JP | 2002-245447 | 8/2002 |
| JP | 2004-215242 | 7/2004 |
| JP | 2004-252948 | 9/2004 |

OTHER PUBLICATIONS

Japanese Office Action dated Oct. 27, 2009.

* cited by examiner

*Primary Examiner*—Samir A. Ahmed
*Assistant Examiner*—Li Liu
(74) *Attorney, Agent, or Firm*—Harness, Dickey & Pierce, P.L.C.

(57) ABSTRACT

An image processor includes a plurality of image processing devices that perform image processing, a storing unit that stores related data set for image data stored in the image processor, a translating unit that translates the related data to internal data, a converting unit that converts the internal data to information corresponding to a program and data used for image processing, and a downloading unit that downloads the information to the image processing devices. The image processing devices perform the image processing based on downloaded information.

11 Claims, 16 Drawing Sheets

FIG.9

```
const u_char Tbl [REQUEST LEVEL 1] [REQUEST LEVEL 2] [REQUEST LEVEL 3] [2]={
  {
        {   {P2, D2}  ,  {P2, D2}  ,  {P2, D2}  ,  {P2, D2}  }  ,
        {   {P0, D0}  ,  {P0, D0}  ,  {P0, D0}  ,  {P0, D0}  }  ,
        {   {P3, D3}  ,  {P3, D3}  ,  {P3, D3}  ,  {P3, D3}  }
  }  ,
  {
        {   {P4, D4}  ,  {P4, D4}  ,  {P4, D4}  ,  {P4, D4}  }  ,
        {   {P5, D5}  ,  {P5, D5}  ,  {P5, D5}  ,  {P5, D5}  }  ,
        {   {P6, D6}  ,  {P6, D6}  ,  {P6, D6}  ,  {P6, D6}  }
  }  ,
  {
        {   {P7, D7}  ,  {P7, D7}  ,  {P7, D7}  ,  {P7, D7}  }  ,
        {   {P8, D8}  ,  {P8, D8}  ,  {P8, D8}  ,  {P8, D8}  }  ,
        {   {P9, D9}  ,  {P9, D9}  ,  {P9, D9}  ,  {P9, D9}  }
  }  ,
  {
        {   {P10, D10}  ,  {P10, D10}  ,  {P10, D10}  ,  {P10, D10}  }  ,
        {   {P11, D11}  ,  {P11, D11}  ,  {P11, D11}  ,  {P11, D11}  }  ,
        {   {P12, D12}  ,  {P12, D12}  ,  {P12, D12}  ,  {P12, D12}  }
  }  ,
  {
        {   {P13, D13}  ,  {P13, D13}  ,  {P13, D13}  ,  {P13, D13}  }  ,
        {   {P14, D14}  ,  {P14, D14}  ,  {P14, D14}  ,  {P14, D14}  }  ,
        {   {P15, D15}  ,  {P15, D15}  ,  {P15, D15}  ,  {P15, D15}  }
  }
}
```

FIG.10

```
const u_char Tbl [REQUEST LEVEL 1] [STORED TEXT DATA] [REQUEST LEVEL 3] [2]={
{
        {   {P2, D2}  ,  {P2, D2}  ,  {P2, D2}  ,  {P2, D2}  }  ,
        {   {P0, D0}  ,  {P0, D0}  ,  {P0, D0}  ,  {P0, D0}  }  ,
        {   {P3, D3}  ,  {P3, D3}  ,  {P3, D3}  ,  {P3, D3}  }
}  ,
{
        {   {P4, D4}  ,  {P4, D4}  ,  {P4, D4}  ,  {P4, D4}  }  ,
        {   {P5, D5}  ,  {P5, D5}  ,  {P5, D5}  ,  {P5, D5}  }  ,
        {   {P6, D6}  ,  {P6, D6}  ,  {P6, D6}  ,  {P6, D6}  }
}  ,
{
        {   {P7, D7}  ,  {P7, D7}  ,  {P7, D7}  ,  {P7, D7}  }  ,
        {   {P8, D8}  ,  {P8, D8}  ,  {P8, D8}  ,  {P8, D8}  }  ,
        {   {P9, D9}  ,  {P9, D9}  ,  {P9, D9}  ,  {P9, D9}  }
}  ,
{
        {   {P10, D10}  ,  {P10, D10}  ,  {P10, D10}  ,  {P10, D10}  }  ,
        {   {P11, D11}  ,  {P11, D11}  ,  {P11, D11}  ,  {P11, D11}  }  ,
        {   {P12, D12}  ,  {P12, D12}  ,  {P12, D12}  ,  {P12, D12}  }
}  ,
{
        {   {P13, D13}  ,  {P13, D13}  ,  {P13, D13}  ,  {P13, D13}  }  ,
        {   {P14, D14}  ,  {P14, D14}  ,  {P14, D14}  ,  {P14, D14}  }  ,
        {   {P15, D15}  ,  {P15, D15}  ,  {P15, D15}  ,  {P15, D15}  }
}
}
```

```
const u_char Prog_Tbl[5][16]= {
/* P0  P1  P2  P3  P4  P5  P6  P7  P8  P9  P10 P11 P12 P13 P14 P15 */
  {29,  1, 29,  0,  3,  5,  5,  5,  5,  5, 28, 28, 28, 29, 29, 29},
  { 0,  0,  0,  0,  0,  0,  0,  0,  0,  0,  0,  0,  0,  0,  0,  0},
  { 0,  0,  0,  0,  0,  0,  0,  0,  0,  0,  0,  0,  0,  0,  0,  0},
  { 0,  0,  0,  0,  0,  0,  0,  0,  0,  0,  0,  0,  0,  0,  0,  0},
  { 0,  0,  0,  0,  1,  0,  0,  0,  0,  0,  0,  0,  0,  0,  0,  0}
}
```

FIG.15

```
const u_char Gammma_DTbl[256][256]= {
  {   0, 255, 255, 255, 255, 255, 255, 255, 255, 255, 255, 255, 255, 255, 255, 255,
    255, 255, 255, 255, 255, 255, 255, 255, 255, 255, 255, 255, 255, 255, 255, 255,
    255, 255, 255, 255, 255, 255, 255, 255, 255, 255, 255, 255, 255, 255, 255, 255,
    255, 255, 255, 255, 255, 255, 255, 255, 255, 255, 255, 255, 255, 255, 255, 255,
    255, 255, 255, 255, 255, 255, 255, 255, 255, 255, 255, 255, 255, 255, 255, 255,
    255, 255, 255, 255, 255, 255, 255, 255, 255, 255, 255, 255, 255, 255, 255, 255,
    255, 255, 255, 255, 255, 255, 255, 255, 255, 255, 255, 255, 255, 255, 255, 255,
    255, 255, 255, 255, 255, 255, 255, 255, 255, 255, 255, 255, 255, 255, 255, 255,
    255, 255, 255, 255, 255, 255, 255, 255, 255, 255, 255, 255, 255, 255, 255, 255,
    255, 255, 255, 255, 255, 255, 255, 255, 255, 255, 255, 255, 255, 255, 255, 255,
    255, 255, 255, 255, 255, 255, 255, 255, 255, 255, 255, 255, 255, 255, 255, 255,
    255, 255, 255, 255, 255, 255, 255, 255, 255, 255, 255, 255, 255, 255, 255, 255,
    255, 255, 255, 255, 255, 255, 255, 255, 255, 255, 255, 255, 255, 255, 255, 255,
    255, 255, 255, 255, 255, 255, 255, 255, 255, 255, 255, 255, 255, 255, 255, 255,
    255, 255, 255, 255, 255, 255, 255, 255, 255, 255, 255, 255, 255, 255, 255, 255,
    255, 255, 255, 255, 255, 255, 255, 255, 255, 255, 255, 255, 255, 255, 255, 255,
  },
  {   0,   0, 255, 255, 255, 255, 255, 255, 255, 255, 255, 255, 255, 255, 255, 255,
    255, 255, 255, 255, 255, 255, 255, 255, 255, 255, 255, 255, 255, 255, 255, 255,
    255, 255, 255, 255, 255, 255, 255, 255, 255, 255, 255, 255, 255, 255, 255, 255,
    255, 255, 255, 255, 255, 255, 255, 255, 255, 255, 255, 255, 255, 255, 255, 255,
    255, 255, 255, 255, 255, 255, 255, 255, 255, 255, 255, 255, 255, 255, 255, 255,
    255, 255, 255, 255, 255, 255, 255, 255, 255, 255, 255, 255, 255, 255, 255, 255,
    255, 255, 255, 255, 255, 255, 255, 255, 255, 255, 255, 255, 255, 255, 255, 255,
    255, 255, 255, 255, 255, 255, 255, 255, 255, 255, 255, 255, 255, 255, 255, 255,
    255, 255, 255, 255, 255, 255, 255, 255, 255, 255, 255, 255, 255, 255, 255, 255,
    255, 255, 255, 255, 255, 255, 255, 255, 255, 255, 255, 255, 255, 255, 255, 255,
    255, 255, 255, 255, 255, 255, 255, 255, 255, 255, 255, 255, 255, 255, 255, 255,
    255, 255, 255, 255, 255, 255, 255, 255, 255, 255, 255, 255, 255, 255, 255, 255,
    255, 255, 255, 255, 255, 255, 255, 255, 255, 255, 255, 255, 255, 255, 255, 255,
    255, 255, 255, 255, 255, 255, 255, 255, 255, 255, 255, 255, 255, 255, 255, 255,
    255, 255, 255, 255, 255, 255, 255, 255, 255, 255, 255, 255, 255, 255, 255, 255,
    255, 255, 255, 255, 255, 255, 255, 255, 255, 255, 255, 255, 255, 255, 255, 255,
  },
           .
           .
  { 0, 0, 0, 0, 0, 0, 0, 0, 0, 0, 0, 0, 0, 0, 0, 0,
    0, 0, 0, 0, 0, 0, 0, 0, 0, 0, 0, 0, 0, 0, 0, 0,
    0, 0, 0, 0, 0, 0, 0, 0, 0, 0, 0, 0, 0, 0, 0, 0,
    0, 0, 0, 0, 0, 0, 0, 0, 0, 0, 0, 0, 0, 0, 0, 0,
    0, 0, 0, 0, 0, 0, 0, 0, 0, 0, 0, 0, 0, 0, 0, 0,
    0, 0, 0, 0, 0, 0, 0, 0, 0, 0, 0, 0, 0, 0, 0, 0,
    0, 0, 0, 0, 0, 0, 0, 0, 0, 0, 0, 0, 0, 0, 0, 0,
    0, 0, 0, 0, 0, 0, 0, 0, 0, 0, 0, 0, 0, 0, 0, 0,
    0, 0, 0, 0, 0, 0, 0, 0, 0, 0, 0, 0, 0, 0, 0, 0,
    0, 0, 0, 0, 0, 0, 0, 0, 0, 0, 0, 0, 0, 0, 0, 0,
    0, 0, 0, 0, 0, 0, 0, 0, 0, 0, 0, 0, 0, 0, 0, 0,
    0, 0, 0, 0, 0, 0, 0, 0, 0, 0, 0, 0, 0, 0, 0, 0,
    0, 0, 0, 0, 0, 0, 0, 0, 0, 0, 0, 0, 0, 0, 0, 0,
    0, 0, 0, 0, 0, 0, 0, 0, 0, 0, 0, 0, 0, 0, 0, 0,
    0, 0, 0, 0, 0, 0, 0, 0, 0, 0, 0, 0, 0, 0, 0, 0,
    0, 0, 0, 0, 0, 0, 0, 0, 0, 0, 0, 0, 0, 0, 0, 255
  }
}
```

FIG.16

(A) { `unsigned char GamTbl[256];   // γ TABLE`

(B)
```
for(u_short i =0;i<256;i++) {
    if(i> Thr) {
        GamTbl[i]=0×256;
    } else {
        GamTbl[i]=0×00;
    }
}
```

FIG.17

(A)
MAGNIFICATION PERCENTAGE OF OPERATING UNIT/MAGNIFICATION PERCENTAGE OF STORED TEXT
=1/3 → A=0
=1/2 → A=1
=1/1 → A=2

(B)
```
const u_char Tbl [REQUEST LEVEL] [A] [REQUEST LEVEL 3] [2]={
    {
        [ {P2,D2}  ,  {P2,D2}  ,  {P2,D2}  ,  {P2,D2} ]  ,
        [ {P0,D0}  ,  {P0,D0}  ,  {P0,D0}  ,  {P0,D0} ]  ,
        [ {P3,D3}  ,  {P3,D3}  ,  {P3,D3}  ,  {P3,D3} ]
    } ,
    {
        [ {P4,D4}  ,  {P4,D4}  ,  {P4,D4}  ,  {P4,D4} ]  ,
        [ {P5,D5}  ,  {P5,D5}  ,  {P5,D5}  ,  {P5,D5} ]  ,
        [ {P6,D6}  ,  {P6,D6}  ,  {P6,D6}  ,  {P6,D6} ]
    } ,
    {
        [ {P7,D7}  ,  {P7,D7}  ,  {P7,D7}  ,  {P7,D7} ]  ,
        [ {P8,D8}  ,  {P8,D8}  ,  {P8,D8}  ,  {P8,D8} ]  ,
        [ {P9,D9}  ,  {P9,D9}  ,  {P9,D9}  ,  {P9,D9} ]
    } ,
    {
        [ {P10,D10} , {P10,D10} , {P10,D10} , {P10,D10} ] ,
        [ {P11,D11} , {P11,D11} , {P11,D11} , {P11,D11} ] ,
        [ {P12,D12} , {P12,D12} , {P12,D12} , {P12,D12} ]
    } ,
    {
        [ {P13,D13} , {P13,D13} , {P13,D13} , {P13,D13} ] ,
        [ {P14,D14} , {P14,D14} , {P14,D14} , {P14,D14} ] ,
        [ {P15,D15} , {P15,D15} , {P15,D15} , {P15,D15} ]
    }
}
```

IMAGE PROCESSOR, IMAGE PROCESSING METHOD, AND COMPUTER PRODUCT

CROSS-REFERENCE TO RELATED APPLICATIONS

This application is based upon and claims the benefit of priority from Japanese Patent Application No. 2004-270847, filed Sep. 17, 2004 and Japanese Patent Application No. 2005-214786, filed Jul. 25, 2005, the entire contents of which are incorporated herein by reference.

BACKGROUND OF THE INVENTION

1. Field of the Invention

The present invention relates to a technology for changing an image processing function in an image processor including multiple image processing devices by modifying programs and data with a single image processing controller.

2. Description of the Related Art

Digital copiers such as Multi Functional Peripheral (MFP) copiers can perform a wide variety of image processings at a high speed. In the MFP copier, a user can make various settings from an operating unit. As a result, an image processing controller in the MFP copier has a complex structure.

An Application Specific Integrated Circuit (ASIC) or a Digital Signal Processor (DSP) is used to control image processing in a digital copier. The DSP has become popular recently, because, it has some advantages. For example, when the DSP is used, various types of image processings can be performed by switching programs and data.

However, the image processing controller that controls the DSP becomes more complex with increased variation in image processing. Moreover, because a user can easily modify image processing specifications, the image processing controller needs to respond quickly and reliably to the modifications, which requires frequent image processing control. This requires the image processing controller to not only meet various requests from the operating unit, but also to respond to modifications in the image processing specifications. Furthermore, because the DSP is more expensive than the ASIC, an image processing that is unlikely to be modified significantly is carried out with the ASIC. Thus, the image processing controller is also required to select or combine image processing devices according to the intended use.

MFP copiers are provided with more advanced and sophisticated features. Specifically, various applications such as a printer connected to a network, a scanner, a facsimile etc. are added to the MFP copier in addition to the copying function. Moreover, the MFP copier can be used simultaneously in multiple ways. For example, while one user is making a large number of copies, another user can printout documents from a network. As a result, the image processing controller is required to perform resource control. When the MFP copier is to be used simultaneously for multiple purposes, the image processing controller manages a status of the resource that is currently being used, and if multiple processes cannot be executed simultaneously, the image processing controller notifies a wait status in response to a subsequent process request.

A conventional method to control the ASIC or the DSP used for modifying process conditions according to settings is explained next. FIG. 19A is a diagram for explaining a case where the ASIC controls the image processing. Because the ASIC has a limited degree of freedom, a process that translates data input via the operating unit into data that is intelligible to the image processing controller controlling the ASIC, and a process that downloads a request based on the translated data are integrated into one process (process P1$a$). Thus, if the image processing specifications are modified, the entire image processing specifications need to be modified, requiring immense efforts.

FIG. 19B is a diagram for explaining a case where the DSP controls the image processing. The controlling process is divided into a process that translates data input from the operating unit into data intelligible to the image processing controller that controls the DSP (process P1$b$) and a process that converts the translated data into detailed information required for downloading data to the DSP and requests downloading to the DSP based on the converted detailed information (process P2$b$). Thus, the image processing controller that controls the DSP can respond to any modification in image processing specifications by carrying out minimum modifications required at each step.

However, modification of control software and resource control for each image processing device is has not been taken into account in the conventional image processing controllers. In other words, the image processing controllers are not intended to be used in image processors such as the MFP copier that requires image processing control in response to complex requests. Moreover, since the image processing controller that controls the DSP is not considered as a "component", porting the image processing controller that controls the DSP in a similar image processor requires large scale modifications.

FIG. 20 is an example of a conventional MFP copier that includes a copying operation as a main function and an operation to control image processing pertaining to stored text data (image data) as a new function. When an image processing controller 101 is used in the copying operation, in other words, when no images are stored, the image processing controller 101 controls image processing devices A103 and B103. An image processing controller 102 separately controls an image processing device C103 for stored text. The image processing controller 101 and the image processing controller 102 perform image processing control independently, and therefore, the structure of the entire MFP system becomes complex.

An embedded image processing controller in the MFP copier preferably has a structure in which the controller is treated as a "component", so that it can be ported with various types of models and easily operated when ported. Thus, what is needed is an image processing controller having a mechanism that switches control by grasping the status of a mounted device and changes control methods according to the image processing device being used, so that a single image processing controller can be ported to control multiple types of image processing devices, thereby carrying out expansion of functions, enabling simultaneous use of multiple functions with the aid of resource control, and enhancing sophistication.

Moreover, image data stored in the MFP copier includes not only image data of the MFP copier itself, but also image data acquired via various input buses from outside devices such as a scanner or a copier connected to a network. In other words, there is no uniformity in the image data stored in the MFP copier. Thus, optimum image processing and image processing parameters need to be used to obtain optimum printout for various types of image data.

SUMMARY OF THE INVENTION

It is an object of the present invention to at least solve the problems in the conventional technology.

According to an aspect of the present invention, an image processor includes a plurality of image processing devices that individually perform image processing, a storing unit that stores related data set for image data stored in the image processor, a translating unit that translates the related data to internal data, a converting unit that converts the internal data to information corresponding to a program and data used for image processing, and a downloading unit that downloads the information to the image processing devices. The image processing devices perform the image processing based on downloaded information.

According to another aspect of the present invention, a method is performed by an image processor. The image processor includes a plurality of image processing devices that individually perform image processing. The method includes storing related data set for image data stored in the image processor, translating the related data to internal data, converting the internal data to information corresponding to a program and data used for the image processing, and downloading the information to the image processing devices. The image processing devices perform the image processing based on downloaded information.

According to still another aspect of the present invention, a computer-readable recording medium stores therein a computer program that implements a method according to the present invention on a computer.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 9 is an example of a reference table having dimensions consisting of request levels of an operating unit;

FIG. 10 is an example of a reference table having dimensions consisting of the request levels of the operating unit and stored text data;

FIG. 15 is an example of γ data that is used for digitization of image data;

FIG. 16 is an example of a computation method used by an image-processing download controller shown in FIG. 13 to select the γ data;

FIG. 17 is an example of a reference table having dimensions consisting of the request levels of the operating unit and values that are computed from the request levels of the operating unit and the stored text data;

DETAILED DESCRIPTION OF THE PREFERRED EMBODIMENTS

Exemplary embodiments of the present invention will be described below with reference to accompanying drawings. The present invention is not limited to these embodiments.

An image processor according to an embodiment includes an image processing controller and various image processing devices controlled by the image processing controller. The image processing controller can change the contents of the image processing performed by the image processing devices by modifying programs and data. The concept of the image processor is to easily expand functions without a complex structure. Accordingly, constituents of the image processing controller are treated as "components" of the image processor, so that a single image processing controller can control the multiple image processing devices.

Figure 1:
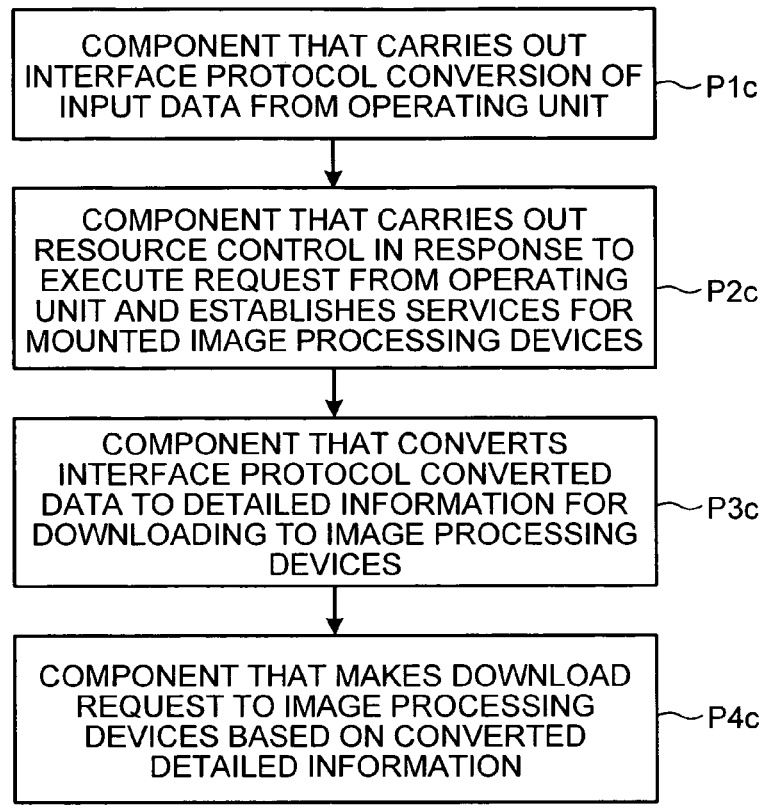
FIG. 1 is an example of a basic structure of an image processing controller according to an embodiment of the present invention.

FIG. 1 is a diagram for explaining the basic structure of the image processing controller according to the embodiment. The image processing controller includes a component (process P1c) that converts data input from an operating unit to an interface protocol (conversion to "internal variable data" or "internal data"), a component (process P2c) that performs resource control in response to an execution request from the operating unit and establishes services for the mounted image processing devices, a component (process P3c) that further converts the data converted to the interface protocol to detailed information (information to control programs and data) to be downloaded to the image processing devices, and a component (process P4c) that makes a download request to the image processing devices based on the converted detailed information.

Figure 19A:
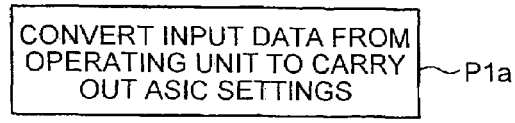
FIG. 19A is a drawing of a structure of a conventional ASIC image processing controller.
Figure 19B:
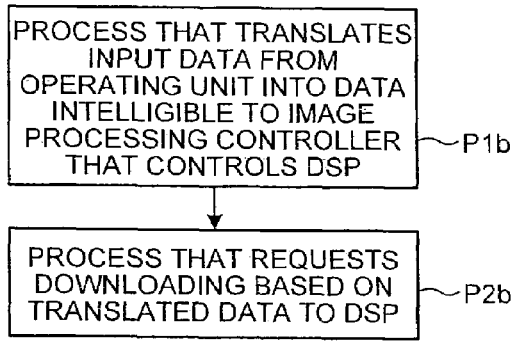
FIG. 19B is drawing of the structure of the conventional DSP image processing controller.
Figure 20:
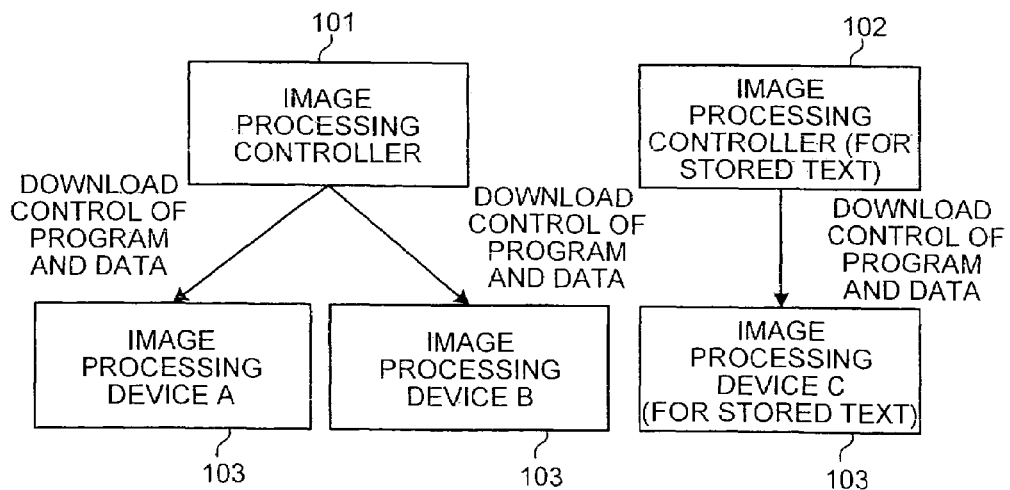
FIG. 20 is an example of a relation between the conventional image processing controller and image processing devices that are controlled by the conventional image processing controller.

In this manner, the process P2c is added to the structure of the conventional image processing controller that controls DSP shown in FIG. 19B, so that constituents of the image processing controller can be treated as "components" of the image processor. Thus, by focusing on the resources and the mounted image processing devices, the image processor enables control when multiple image processing devices are requested to be used simultaneously. Moreover, a single image processing controller can control multiple image processing devices. Further, the process P1b shown in FIG. 19B is divided into the component of process P1c and the component of process P3c in the embodiment shown in FIG. 1.

Figure 2:
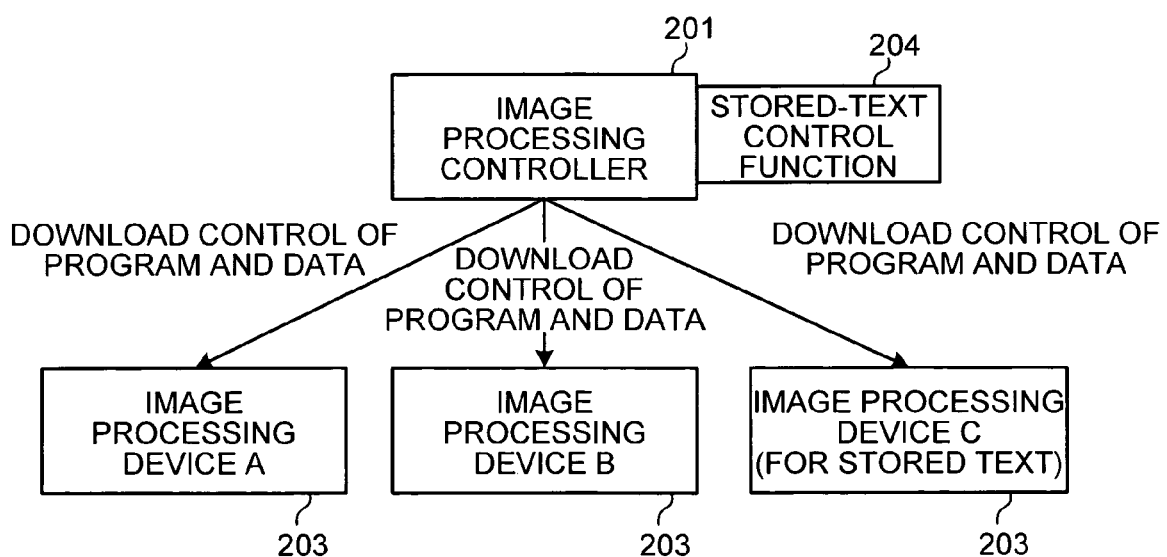
FIG. 2 is an example of a relation between the image processing controller shown in FIG. 1 and image processing devices that are controlled by the image processing controller.

FIG. 2 is a schematic of an image processor according to the embodiment. The image processor includes an image processing controller 201 and a plurality of image processing devices 203 that are controlled by the image processing controller 201. The image processing controller can be an MFP copier or any other similar device.

Because each constituent of the image processing controller 201 is treated as a "component" as shown in FIG. 1, a stored-text control function 204 can be added as a "component" to the image processing controller 201. Moreover, the image processing devices 203 that carry out the copying operation and the image processing of stored images typically use the same ASIC or DSP. Therefore, a single image processing controller 201 can control a copying operation and image processing of stored images so that the structure of the entire MFP system can be made simple. Further, by treating the stored-text control function 204 as a "component", the stored-text control function 204 can be added to an image processing device that includes a storage function, or can be removed from an image processing device that does not include a storage function, thereby responding flexibly to various types of image processing devices. Thus, new functions can be added conveniently and easily to the image processing controller 201.

In the subsequent explanation, the present invention is applied to an image processor (MFP copier) provided with multiple image processing devices that carry out image processing according to instructions from the operating unit for an image read by a scanner or a stored image in the image processor.

Figure 3:
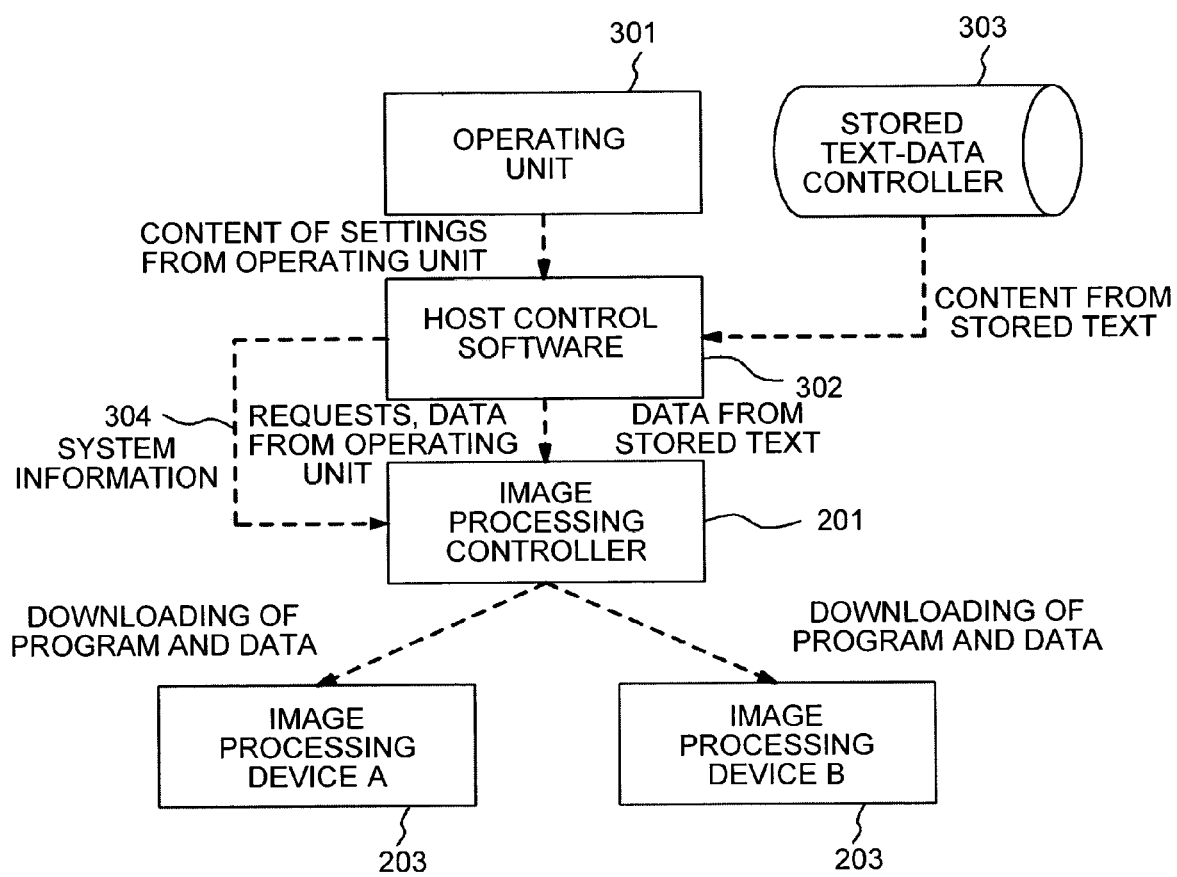
FIG. 3 is a block diagram of a concept of an entire image processing control system using the image processing controller shown in FIGS. 1 and 2.

FIG. 3 is a block diagram of a concept of the entire image-processing control system using the image processing controller 201 according to the embodiment. The image-processing control system includes an operating unit 301 with which a user requests a process and inputs settings pertaining to process conditions, a stored text-data controller 303 that controls stored images and related data, a host control software 302 that controls data input from the operating unit 301 and related data of stored images from the stored text-data controller 303, the image processing controller 201 that controls downloading of information to the image processing devices 203 and resource status, the image processing devices 203 that use the ASIC or the DSP to carry out image processing based on the information received from the image processing controller 201. Although two image processing devices, A and B, are shown in FIG. 3, there can be more than two image processing devices.

A user can set various process conditions with the operating unit 301. The host control software 302, which is a service layer, divides the data set at the operating unit 301 into tasks based on settings content and time, when settings are made, and transmits the tasks to the image processing controller 201 as processes. The host control software 302 also simultaneously transmits the related data of the stored images from the stored text-data controller 303 together with the data from the operating unit 301 to the image processing controller 201.

In the image processing controller 201, the data input from the operating unit 301 differs according to the user's request and the related data of the stored images from the stored text-data controller 303 are converted into information for controlling programs and data that need to be set in each of the image processing devices 203. The data from the operating unit 301 is higher data than the related data of the stored images from the stored text-data controller 303. An operation mode is set via the operating unit 301 to specify whether to carry out a copying operation (operation that does not carry out image storage) or an operation to reprint the stored images.

First, the image processing controller 201 reads application data (operation mode) specified by the user with the operating unit 301. From the read data, the image processing controller 201 determines whether the process request can be executed using only the data from the operating unit 301 or whether the related data of the stored images from the stored text-data controller 303 is also required. The image processing controller 201 does not read the data that is not necessary.

The image processing controller 201 inquires the host control software 302 for system information. The system information supports modifications in an Image Processing Unit (IPU) board during a designing phase or modifications in the number and types of the image processing devices mounted on the IPU board, and determines the type of the existing IPU board and the number of the mounted image processing devices A203 and B203 as well as information that indicates busy status of a resource. The image processing controller 201 recognizes the types and the number of the image processing devices and mounting status of the IPU board from the system information, so that downloading control can be performed with the aid of a single image processing controller 201 regardless of the design phase.

Thus, because there is no need to modify a process for use in an image processor that includes different number and types of image processing devices, the image processing controller 201 according to the embodiment can be easily made compatible with various types of image processors.

The data input from the operating unit 301 includes data that indicates various requests such as application data specified by the user, mode level such as character mode, function level that directly specifies a program number of a modulation transfer function (MTF) filter, and service command. The related data of the stored images from the stored text-data controller 303 includes a character mode selected by the user with the aid of the operating unit 301 when saving the stored images, data that indicates whether the original is dark or light etc. The related data of the stored images is stored by the system.

Based on the data from the operating unit 301 and the related data of the stored images from the stored text-data controller 303, the image processing controller 201 converts the data input from the operating unit 301 and the related data of stored images into detailed information necessary for downloading to the image processing devices 203. The image processing controller 201 downloads the detailed information to an internal memory of the image processing devices 203 based on program and data that are converted by the image processing controller 201 itself. After the detailed information is downloaded, the image processing devices 203 carry out image processing according to the downloaded program and data.

Figure 4:
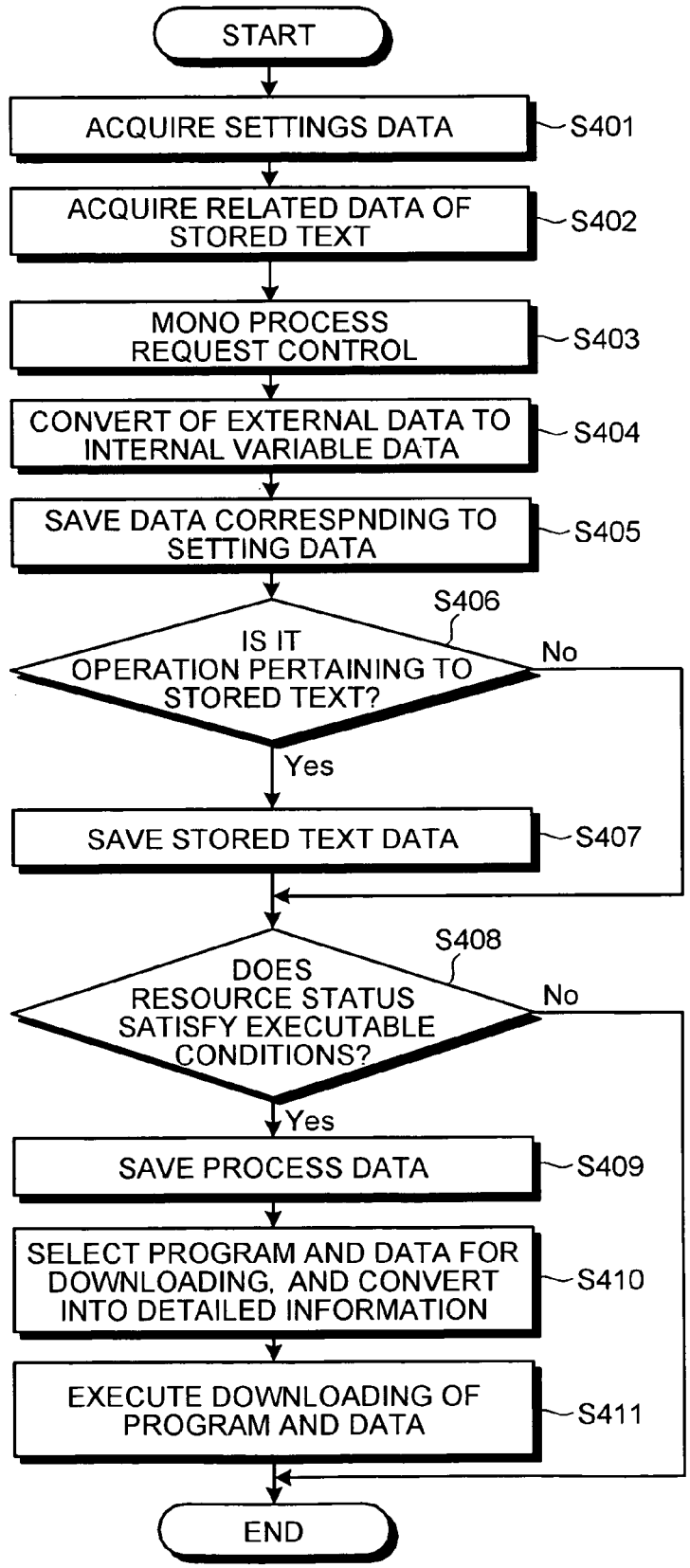
FIG. 4 is a flowchart of a process procedure performed by the image processing controller shown in FIGS. 1 and 2.
Figure 5:
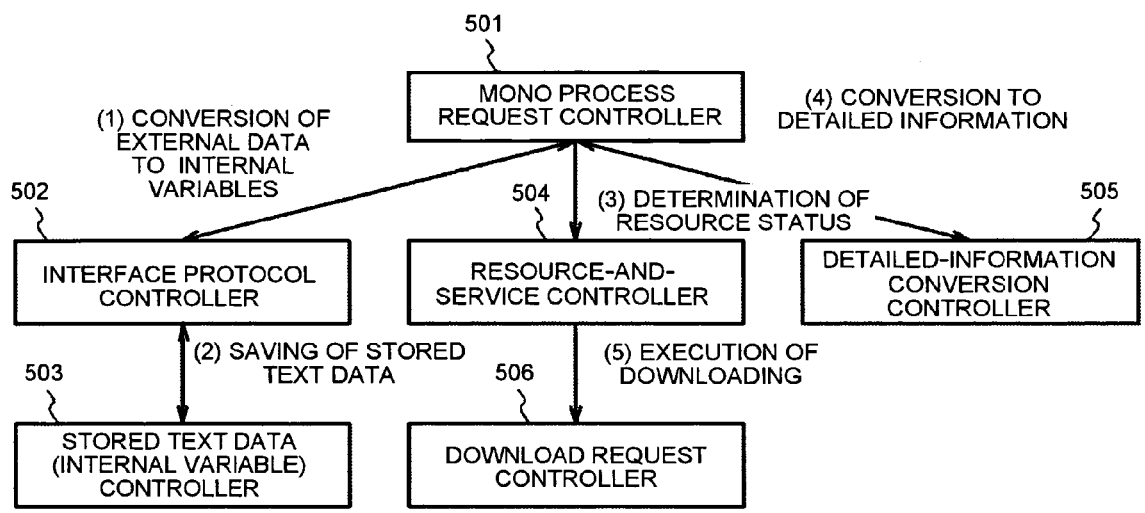
FIG. 5 is a sequence of a mono process performed by the image processing controller shown in FIGS. 1 and 2.

A control operation performed by the image processing controller 201 is explained with reference to FIGS. 4 and 5. FIG. 4 is a flowchart of a processing performed by the image processing controller 201. FIG. 5 is a diagram of a sequence of a mono process performed by the image processing controller 201 to carry out image processing for stored images.

The image processing controller 201 acquires settings data, from the host control software 302 (step S401). The settings data is the data input a user with the operating unit 301. The image processing controller 201 also acquires related data of the stored images from the stored text-data controller 303 (step S402). The user's request includes various types of data such as process data, character mode, image size, darkness or lightness of the original, magnification percentage, MTF filter number, etc.

This data enables the image processing controller 201 to recognize information on the stored images with more accuracy, and to set an optimum image processing and image processing parameters for the stored images, thereby enhancing the quality of image output.

Based on the received data, the image processing controller 201 manages the current process request as one process request with the aid of a mono process request controller 501 (step S403). Next, the image processing controller 201 requests an interface protocol controller 502 to convert the external data, i.e. the settings data and the related data of the stored images to internal variable data (step S404). The process at step 404 is carried out at sequence (1) shown in FIG. 5. Although conversion of the external data into internal variables increases the number of processes, such a conversion prevents the subsequent processes inside the image processing controller 201 from being affected by variations in external data.

The image processing controller 201 saves data corresponding to the settings data included in the internal variable data in a detailed-information conversion controller 505 (step S405). Based on application data, which is data that specifies whether the requested process is a copying process or a process pertaining to the stored text, included in the internal variable data corresponding to the settings data, the interface protocol controller 502 determines whether the process requested by the user is a process pertaining to the stored text or images (step S406). If the requested process is a process pertaining to the stored text ("Yes" at step S406), the interface protocol controller 502 stores the related data of the stored text in a stored text data (internal variable) controller 503 (step S407). The process at step 407 is carried out at sequence (2) shown in FIG. 5.

After converting the process data into internal variables, the mono process request controller 501 requests a resource-and-service controller 504 to determine a resource status (step S408). The process at step S408 is carried out at sequence (3) shown in FIG. 5. The resource-and-service controller 504 determines whether a relation between a previously acquired resource status and a resource that needs to be acquired based on the current process data satisfies executable conditions. If this relation satisfies executable conditions ("Yes" at step S408), the resource-and-service controller 504 stores the current process data (step S409) and the system control proceeds to the next step. If this relation does not satisfy executable conditions ("No" at step S408), the resource-and-service controller 504 notifies a wait status to the host control software 302, so that the user needs to issue a process request again.

The mono process request controller 501, upon receiving a result of determination from the resource-and-service controller 504, requests the detailed-information conversion controller 505 to select detailed information that is necessary for downloading programs and data to the image processing devices 203. The detailed-information conversion controller 505 refers to the internal variable data from the operating unit 301, the data stored in the stored text data (internal variable) controller 503, and converts the data into detailed information (step S410). The process at step S410 is carried out at sequence (4) shown in FIG. 5. The detailed information, which is an abstract concept, is used instead of directly downloading the internal variable data and the related data of the stored text to the image processing devices 203. In other words, information to control programs and data is used at an abstract level to enhance reusability of the internal variable data and the related data of the stored text.

Finally, the resource-and-service controller 504 sends the detailed information to a download request controller 506 that controls drivers of the currently mounted image processing devices 203, and the download request controller 506 downloads the programs and the data to the image processing devices 203 (step S411). The process at step S411 is carried out at sequence (5) shown in FIG. 5.

At step S411, the image processing controller 201, when necessary, inquires the host control software 302 for the system information pertaining to the number and the types of the mounted image processing devices 203, acquires the system information from the host control software 302, and specifies the image processing devices 203 that are to be controlled. After specifying the image processing devices 203, the image processing controller 201 downloads the programs and the data, and ends the requested image processing. After ending the image processing, the image processing controller 201 once again waits for input from the operating unit 301.

Thus, optimum image processing can be carried out on previously read image data as well as image data transmitted via a network, thereby enabling a high quality image output.

Figure 6:
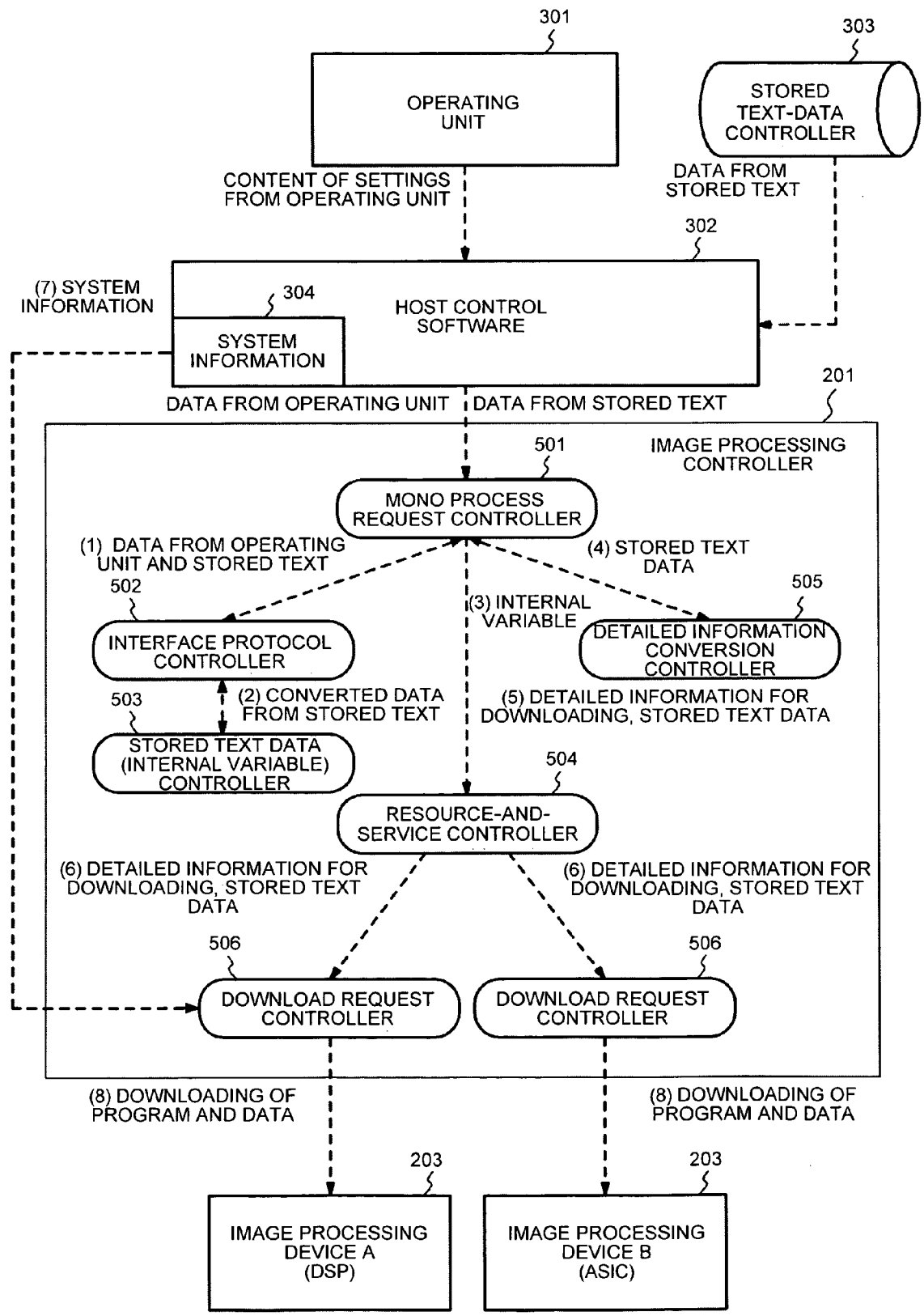
FIG. 6 is a block diagram of a concept of the entire image processing control system using the image processing controller shown in FIGS. 1 and 2.

FIG. 6 is a block diagram of a concept of the entire image processing control system in the image processor (MFP copier) according to the embodiment. The structure of the image processing system and flow of data are shown. Further, a control sequence (1) through (8) of the mono process in the image processing controller 201 is also shown.

The image processing control system includes the operating unit 301 that is used by the system user to request a process and input settings of the process conditions, the stored text-data controller 303 that controls the stored images and the related data, the host control software 302 that controls the data input from the operating unit 301 and the related data of the stored images from the stored text-data controller 303, the image processing controller 201 that controls downloading of data to the image processing devices 203, and the image processing devices 203 that uses the ASIC or the DSP to carry out image processing based on the information downloaded by the image processing controller 201 (two image processing devices, A and B, are shown in FIG. 6).

The internal structure of the image processing controller 201 shown in FIG. 6 differs from that of the image processing controller 201 shown in FIG. 3. The mono process request controller 501 assumes the role of a manager that controls the sequence of the mono process. The interface protocol controller 502, the resource-and-service controller 504, and the detailed-information conversion controller 505 send information required for execution of the requested process together with a request to execute the process. The download request controller 506 is provided for each of the image processing devices 203.

The control operation performed by the image processing controller 201 is explained next while referring to the control sequence (1) through (8) of the mono process.

An image processing control request resulting from a scanner process or a printer process is input from the operating unit 301, and is then sent from the host control software 302 to the mono process request controller 501. In sequence (1), the mono process request controller 501 requests the interface protocol controller 502 to convert the data input from the operating unit 301 and the related data of the stored images sent from the stored text-data controller 303, and the data input from the operating unit 301 is converted to internal variables that are controlled by the detailed-information conversion controller 505.

The related data of the stored images is also converted and controlled in sequence (2). Specifically, based on the process data included in the data input from the operating unit 301, the interface protocol controller 502 determines whether the requested process is pertaining to the stored text. If the requested process is not pertaining to the stored text, the interface protocol controller 502 converts only the data input from the operating unit 301. If the requested process is pertaining to the stored text, the interface protocol controller 502 also converts the related data of the stored images from the stored text-data controller 303, and stores the converted internal variables in the stored text data (internal variable) controller 503. Although conversion of the external data into the internal variables increases the number of processes, such a conversion enables to prevent the subsequent processes inside the image processing controller 201 from being affected by variations in the external data.

In sequence (3), the mono process request controller 501 requests the resource-and-service controller 504 to determine a resource status. The resource-and-service controller 504 determines whether a relation between the previously acquired resource status and a resource that needs to be acquired based on the current process data satisfies executable conditions. If this relation satisfies executable conditions, the resource-and-service controller 504 proceeds to the next step. If the relation does not satisfy executable conditions, the resource-and-service controller 504 notifies a wait status to the host control software 302, and the user needs to issue a process request again.

In sequence (4), the mono process request controller 501, upon receiving a result of determination from the resource-and-service controller 504, requests the detailed-information conversion controller 505 to select detailed information that is necessary for downloading programs and data to the image processing devices 203. The detailed-information conversion controller 505 refers to the internal variable data from the operating unit 301 that is controlled by the detailed-information conversion controller 505 itself, and the converted data that is sent from the stored text data (internal variable) controller 503, and converts the data to detailed information. The detailed information, which is an abstract concept, is used instead of directly downloading the internal variable data and the converted data from the stored text data (internal variable) controller 503 to the image processing devices 203. In other words, information to control programs and data is used at an abstract level to enhance reusability of the internal variable data and the related data of the stored text.

In sequence (5), the mono process request controller 501 sends to the resource-and-service controller 504, the converted data of the stored text and the detailed information for downloading, and issues an execute download request for downloading the data to the image processing devices 203.

In sequence (6), upon receiving the execute download request, the resource-and-service controller 504 specifies the mounted image processing devices A203 and B203 for downloading the detailed information, and sends the detailed information to the download request controllers 506 that control the drivers of each of the image processing devices A203 and B203.

If system information 304 such as the number of the DSPs etc. is necessary for download control, in the sequence (7), the image processing controller 201 inquires the host control software 302 for the system information 304 and specifies the image processing devices 203 to which data is to be downloaded. If each of the image processing devices employs the DSP, internal image processing in the DSP can be easily modified by changing the image processing program. Thus, design can be easily modified. By changing image processing algorithm in the design phase, the number of the DSP in the IPU board can be switched. The download request controller 506 of the image processing device A203, which is the DSP, inquires the host control software 302 for the system information 304 such as number of the DSP, and specifies the image processing devices 203 for downloading. If the image processing device B203 is the ASIC, the number of the ASIC is unlikely to be switched because image processing algorithm in the ASIC is fixed and cannot be modified. Because there is no need to monitor the system information 304, the download control is carried out based on only the information inside the download request controller 506 without any referring function. The system information 304 inquired by the download request controller 506 depends on the type of the image processing device 203 and is not required for all types of the image processing devices 203. Because the system information 304 is largely dependent on the type of the mounted image processing devices 203, the download request controllers 506, which are closest to the image processing devices 203, collect the information that is prone to variation.

Finally, in sequence (8), each of the download request controllers 506 download the program and the data to the respective image processing devices 203. Based on the detailed information, the related data of the stored text, and the request to execute download, the download request controllers 506 download the program and the data to the respective image processing devices 203, thereby ending the process. By providing the download request controller 506 for each of the image processing devices 203, the download request controllers 506 are also treated as components, thereby minimizing switching according to the number and the types of the mounted image processing devices 203 in the MFP copier. Upon completion of the process performed by the image processing controller 201, the image processor once again waits for input from the operating unit 301.

In conventional image processing control systems, simultaneous execution of copying operation and output of the stored text is not considered, so the interface protocol conversion is carried out independently for each application. However, in the embodiment, image processing is carried out for operations pertaining to the stored text and a copying operation, and therefore, interface protocol conversion is also carried out for the related data of the stored images from the stored text-data controller 303.

Figure 7:
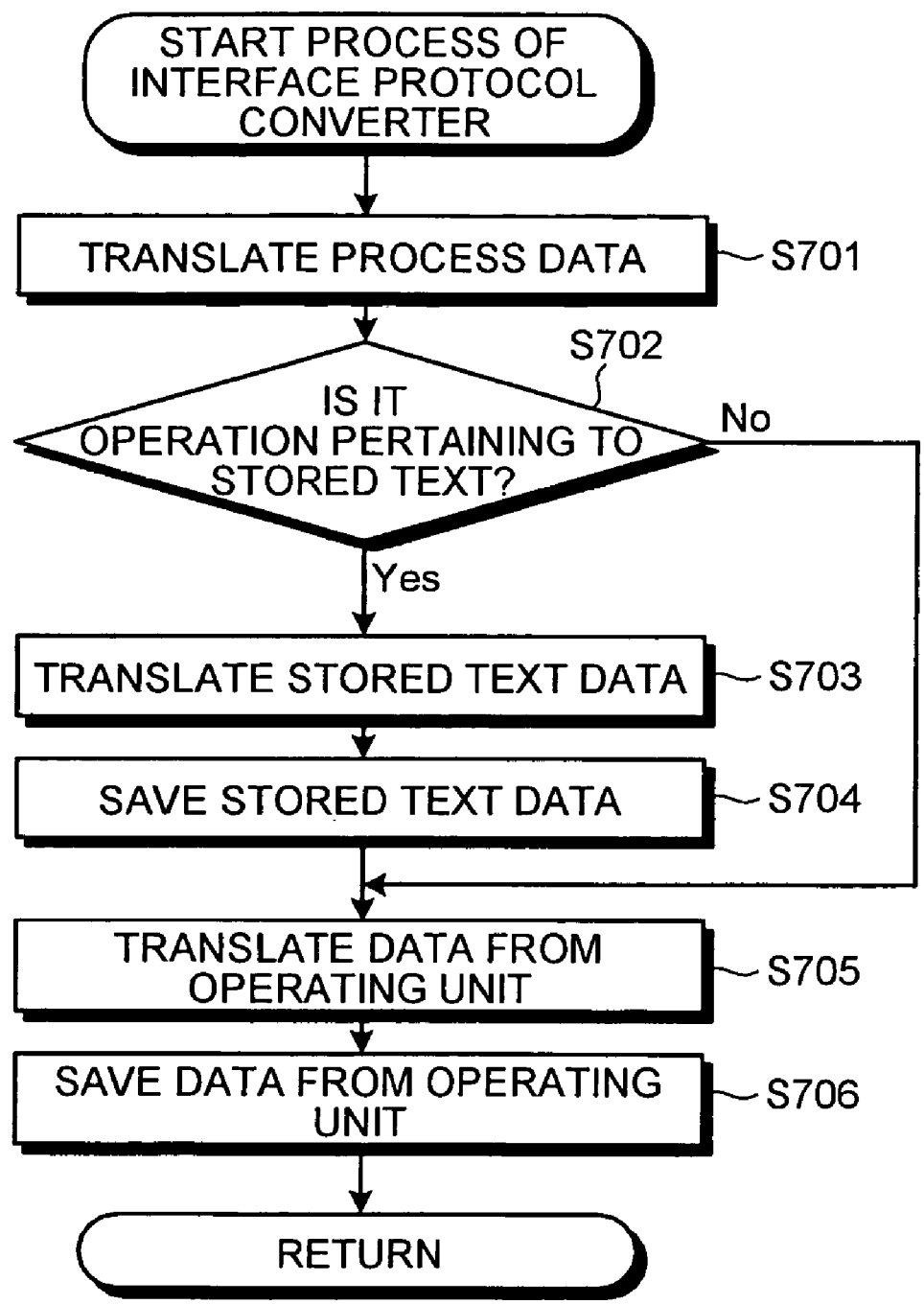
FIG. 7 is a flowchart of a process procedure performed by an interface protocol controller shown in FIGS. 5 and 6.

FIG. 7 is a flowchart of a processing performed by the interface protocol controller 502. The interface protocol controller 502 executes a process to translate the process data included in the data input from the operating unit 301 (step S701). The process data is required for both a copying operation as well as an operation to output the stored text, and is used to specify the application that is instructed by the user. Hence the process data is translated first.

Next, based on the translated process data, the interface protocol controller 502 determines whether the requested process is an operation to output the stored text (step S702). This step is carried out to omit the process for the related data of the stored text that is unnecessary for the copying operation. In other words, the settings from the operating unit 301 are required for both the copying operation and the operation to output the stored text, but the related data of the stored images is required only for processes pertaining to the stored text. Based on the translated process data, the interface protocol controller 502 determines whether the related data of the stored images from the stored text-data controller 303 is required for control of the currently specified operation, and if the related data of the stored images from the stored text-data controller 303 is not required for the control of the specified operation such as copying operation, the interface protocol controller 502 omits translation and storing processes pertaining to the related data of the stored images from the stored text-data controller 303 that is not likely to be used even if stored.

If the requested process is the operation to output the stored text ("Yes" at step S702), the interface protocol controller 502 translates the related data of the stored images into the form of internal variables (step S703). Next, the interface protocol controller 502 stores the internal variable data (translated stored-text data 708 shown in FIG. 8) obtained as a result of the translation, in the stored text data (internal variable) controller 503 (step S704).

Because the data input from the operating unit 301 is required for all operations, the interface protocol controller 502 always translates the data input from the operating unit 301, obtains the result in the form of internal variables (step S705) and stores the internal variable data (translated operating-unit data 707 shown in FIG. 8) in the detailed-information conversion controller 505 (step S706). The string of processes is carried out for any application. In the example shown in FIG. 7, if the requested process is pertaining to the copying operation, the translating process and the saving process of the data input from the operating unit 301 are carried out immediately after determining whether the requested process is an operation pertaining to the stored text, and if the requested process is the operation to output the stored text, the translating process and the saving process of the data input from the operating unit 301 are carried out together with the translating process and the saving process of the related data of the stored images.

Thus, by adding a function of determining whether the requested process is the operation to output the stored text, translation and storing of unnecessary data can be omitted, thereby enhancing the speed of the process. Further, a single interface protocol controller 502 can translate the related data of the stored text that is required in the added application of the operation to output the stored text, and store the result of the translation as the internal variable data.

Figure 8:
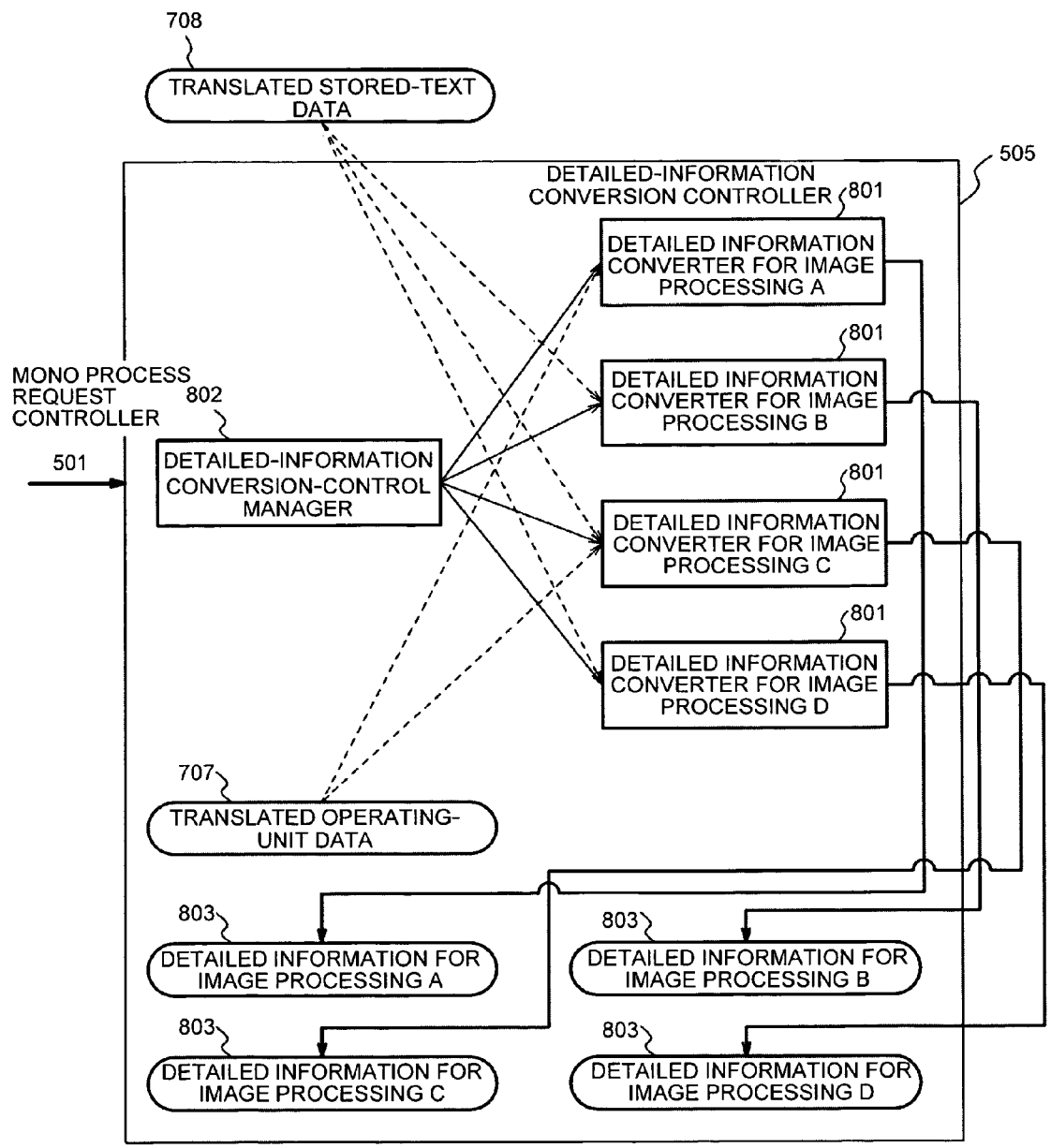
FIG. 8 is a drawing of an internal structure of a detailed-information conversion controller shown in FIGS. 5 and 6.

FIG. 8 is a diagram of the structure of the detailed-information conversion controller 505. The detailed-information conversion controller 505 includes a detailed-information conversion-control manager 802 and detailed information converters 801 for image processings A, B, C, and D, respectively. In the detailed-information conversion controller 505, each of the detailed information converters 801 converts the internal variable data to detailed information in units of the image processings A, B, C, and D. Therefore, structures of the translated operating-unit data 707 and the translated stored-text data 708 that are required for the conversion are shown in FIG. 8 for reference.

Operation of the detailed-information conversion controller 505 is explained with reference to FIG. 8. First, the mono process request controller 501 (see FIGS. 5 and 6) sends a detailed information conversion request to the detailed-information conversion controller 505. The detailed-information conversion-control manager 802 always receives an external request to the detailed-information conversion controller 505.

According to the received detailed information conversion request, the detailed-information conversion-control manager 802 sends conversion requests (lines shown in FIG. 8) pertaining to the respective image processing to each of the detailed information converters 801 for the image processing A through D. According to the conversion requests received from the detailed-information conversion-control manager 802, each of the detailed information converters 801 for the image processing A through D convert the internal variable data to detailed information 803 pertaining to the respective image processings.

All the detailed information converters 801 for the image processings A, B, C, and D use the data translated by the interface protocol controller 502 (see FIG. 7) for conversion. As indicated by the dotted lines shown in FIG. 8, the detailed information converters 801 refer to the translated operating-unit data 707 to obtain the required data from the operating unit 301, and refer to the translated stored-text data 708 to obtain the required stored text data.

The detailed information converters 801 for the image processings A, B, C, and D determine the data necessary for the conversion and acquire only the data that is required for conversion to the detailed information from the respective data sources. Depending on the image processing, at least one of the translated operating-unit data 707 and the translated stored-text data 708 is required for image processing control. Because the required data is determined according to the image processing, the detailed information converters 801 for the image processings A through D are structured as modifiable units of the detailed-information conversion controller 505 and can be modified according to the control request.

Each of the detailed information converters 801 for the image processings A, B, C, and D select the detailed information after referring to the required data, and store the detailed information 803 for the respective image processings in the respective storage areas. The detailed information 803 for each of the image processings A, B, C, and D is also stored and controlled as a detailed information cluster by the detailed-information conversion controller 505.

The detailed information can be converted by using a reference table. FIG. 9 is an example of a reference table having dimensions consisting of request levels of the operating unit 301. As evident from the example in which the DSP is used as the image processing device 203 (see FIGS. 2 and 3), program and data can be rewritten freely. Because the user intends to use the image processor for carrying out image processing of different variations, information pertaining to program and data that need to be downloaded can always change according to the request level of the operating unit 301. If a source code that changes frequently is used to control the program and the data for downloading, the frequency of operation is increased.

The detailed information converters 801 (see FIG. 8) that are included in the detailed-information conversion controller 505 control the program and the data for downloading with the aid of the reference table (shown in FIG. 9) having dimensions consisting of the request levels of the operating unit 301, and based on the translated data, select the detailed information 803 (see FIG. 8) that requests the download request controllers 506 (see FIGS. 5 and 6) for the program and the data that are downloaded to the image processing devices 203.

The reference table shown in FIG. 9 includes [request level 1], [request level 2], and [request level 3] of the operating unit 301 as dimensions and is used to select PX (program type) and DX (data type). If the user wants to change the program and the data that are required to be downloaded according to the request level of the operating unit 301 without causing any change in control parameters in the [request level 1], the [request level 2], and the [request level 3], the user rewrites a program number PX and a data number DX based on the reference table, regardless of the source code. Accordingly, a request to the download request controller 506 can be changed, because it is the source code that actually refers to the table and selects the program and the data required for downloading. Thus, content of the program and the data for downloading to the respective image processing devices 203 can be modified with the aid of the table reference method.

A control structure based on the table reference method shown in FIG. 9 not only enables the detailed-information conversion controller 505 to select the program and the data according to the request level of the operating unit, but also to refer to the translated stored-text data 708 and control the content of the translated stored-text data 708.

FIG. 10 is an example of the reference table having dimensions consisting of the request levels of the operating unit 301 and the stored text data. The example of the reference table shown in FIG. 10 uses the same control structure based on the table reference method shown in FIG. 9. However, a second dimension of the reference table shown in FIG. 10 consists of the [stored text data], thereby enabling the detailed-information conversion controller 505 to refer to the translated stored-text data 708.

The control structure based on the table reference method applied to an image processing control system that carries out the copying operation and the operation to output the stored text data is explained below. A mechanism provided in the detailed information converter 801 for the image processing A carries out switching control of the reference table according to the copying operation or the operation to output the stored text.

Figure 11:
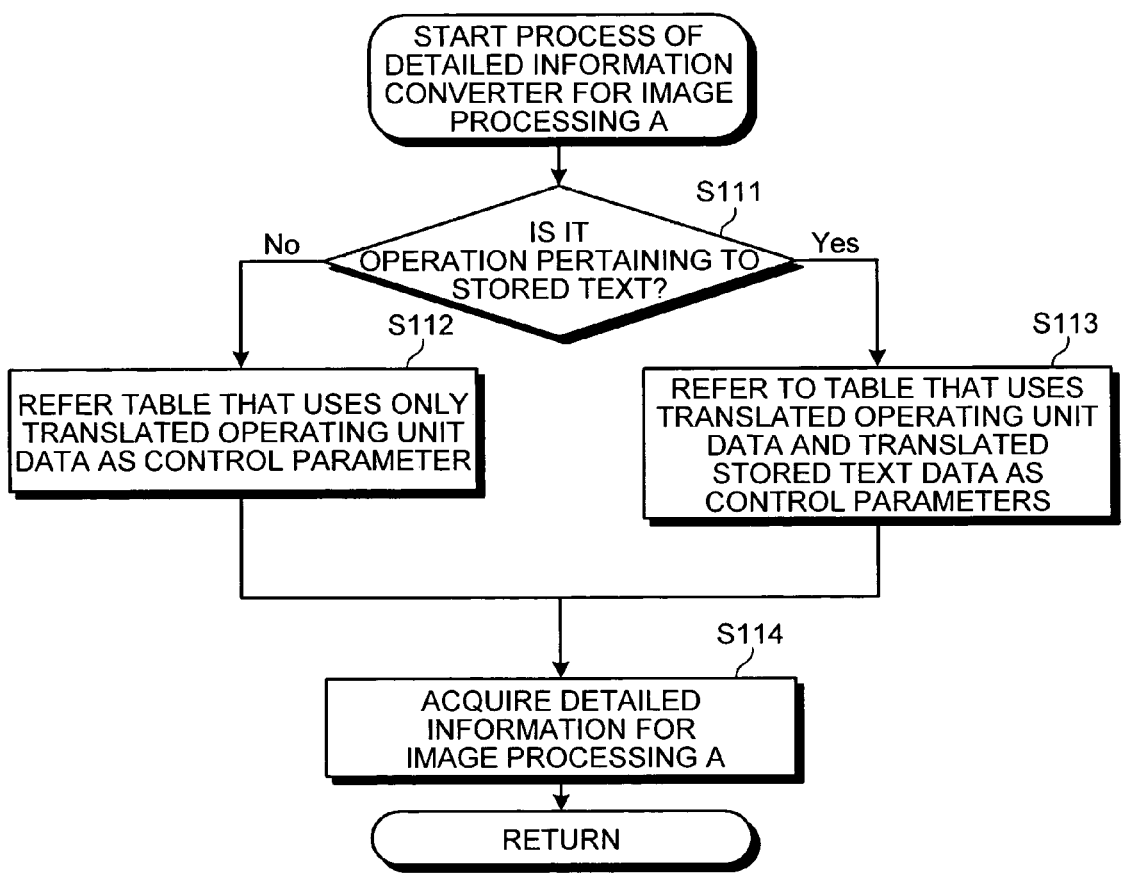
FIG. 11 is a flowchart of a switching control procedure of the reference table performed by a detailed information converter shown in FIG. 8.

FIG. 11 is an example of a flow of switching control of the reference table based on the determination of whether the requested process is pertaining to the stored text. The copying operation and the operation to output the stored text are controlled with the aid of reference tables for the copying operation and the operation to output the stored text, respectively. The detailed information converter 801 for the image processing A in the detailed-information conversion controller 505 (see FIG. 8) carries out the control operation to switch the reference tables shown in FIG. 9 and FIG. 10.

In the flow of switching control shown in FIG. 11, first, based on the process data included in the translated operating-unit data 707, the detailed information converter 801 determines whether the requested process is pertaining to the stored text (step S111). If the requested process is pertaining to the stored text ("Yes" at step S111), the detailed information converter 801 refers to the reference table shown in FIG. 10 that enables the detailed information converter 801 to also refer to the translated stored-text data 708 (step S113). The detailed information converter 801 grasps the translated stored-text data 708 and the dimensions of the table that are required to refer to the table, refers to the table, and obtains the detailed information 803 for the image processing A (step S114).

If the requested process is not pertaining to the stored text ("No" at step S111), the detailed information converter 801 refers to the reference table that enables the detailed information converter 801 to refer only to the translated operating-unit data 707 (step S112) and obtains the detailed information 803 for the image processing A (step S114).

Because the external data that is used or the reference table that is provided changes according to the control request pertaining to the requested process, the detailed information converter 801 is designed as a modifiable unit. Although only the detailed information converter 801 for the image processing A is shown in FIG. 11, each of the detailed information converters 801 for the respective image processing also carries out a similar process and convert the program and the data to the detailed information 803.

Thus, the table reference method enables the detailed-information conversion controller 505 to determine the program and the data for downloading with the aid of the data input from the operating unit 301 in addition to the related data of the stored image data. Accordingly, image processing can be performed according to the user's request to output the image data.

An execution level structure of the download request controller 506 (see FIGS. 5 and 6) in the image processing system according to the embodiment is explained next.

Figures 12, 13:
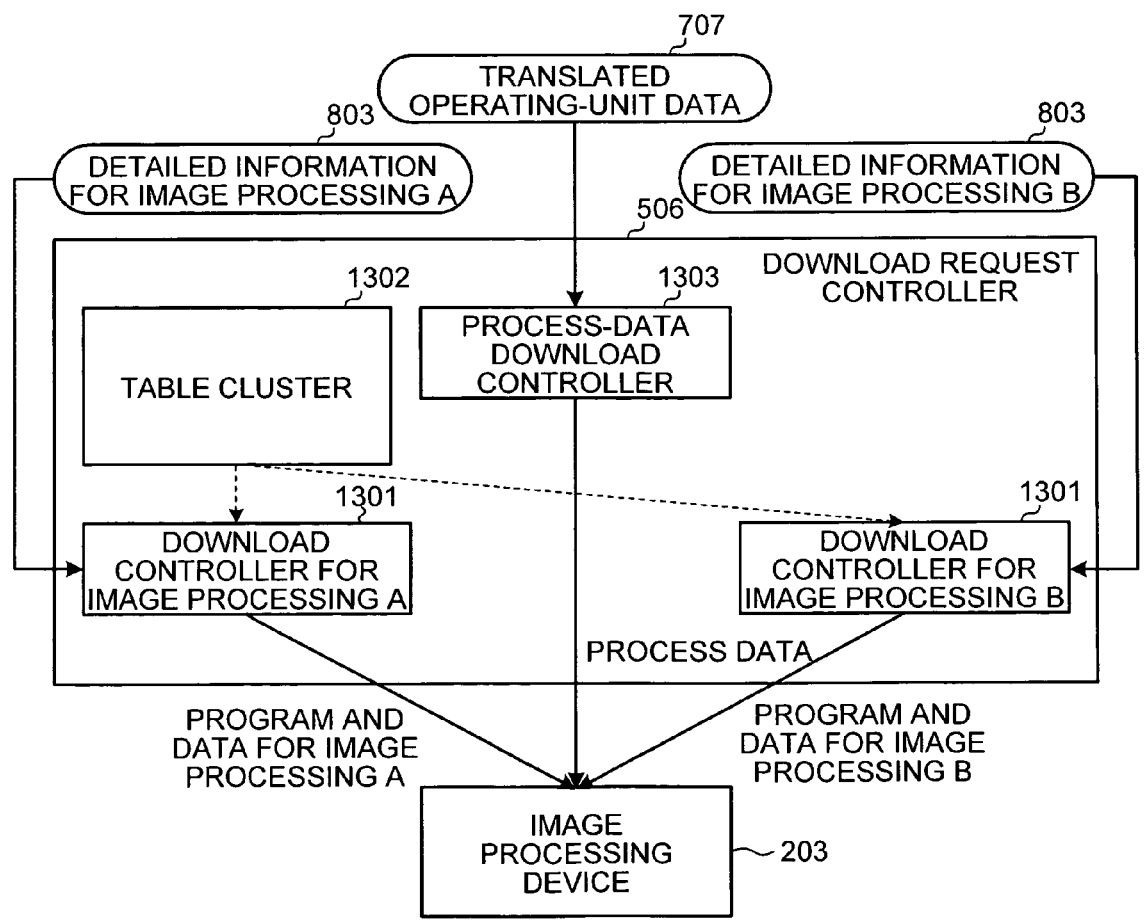
FIG. 12 is a program table that is referred to by a download request controller shown in FIGS. 5 and 6 for downloading a program.
FIG. 13 is a drawing of an internal structure of the download request controller.

FIG. 12 is an example of a program table referred to by the download request controller 506 when downloading a program to the image processing devices 203 (see FIGS. 1 and 2). As evident from the example in which the DSP is used as the image processing devices 203, program and data can be rewritten freely. Because the user intends to use the image processor for implementing image processing of different variations, information pertaining to the program and the data that need to be downloaded can always change according to the request level of the operating unit 301. If a source code that changes frequently is used to control the program and the data for downloading, the frequency of operation is increased.

Based on a program number and a data number that are determined by the detailed information converter 801 that translates the program and the data into data that is intelligible to the image processing controller 201 controlling the DSP, the download request controller 506 selects multiple programs included in the program table shown in FIG. 12 that are related to the program number, and executes a download request to download the selected programs to the image processing devices 203.

For example, if a program number P8 is selected from the program table shown in FIG. 12, the download request controller 506 issues a download request to the image processing devices 203 to download five programs indicated by numbers 5, 0, 0, 0, and 0 from the program table shown in FIG. 12 to the image processing devices 203.

Thus, the reference table can be modified in response to any modifications in the program or the data for downloading, so that the functions of the image processing device can be easily ported, expanded, or modified.

Although settings of the program and the data for image processing can be implemented in a conventional method, settings of the process data cannot be implemented. The download request controller 506 that enables to implement the settings of the process data is explained next.

FIG. 13 is a structure of the download request controller 506. The download request controller 506 shown in FIG. 13 includes image-processing download controllers 1301, a table cluster 1302, and a process-data download controller 1303. The download request controller 506 shown in FIG. 13 carries out download control for image processings A and B, and includes the image-processing download controllers 1301 for each of the image processings A and B.

The structure and the operation of the download request controller 506 is explained with reference to FIG. 13. The settings items are broadly divided into two categories. One category of the setting items includes the program and the data from the image-processing download controllers 1301 that are required to execute the image processing. The other category includes the process data such as image size that is subjected to image processing. The process-data download controller 1303 controls the process data.

As in the conventional method, the program and the data are input into each of the image-processing download controllers 1301 as the detailed information 803 for the respective image processing (see FIG. 8). The image-processing download controllers 1301 refer to the table cluster 1302 that is similar to the program table shown in FIG. 12 and controlled by the download request controller 506 and specify the download setting values to execute downloading of the program and the data.

The process data is a fixed data in the mono process and includes application data that enables to determine whether the requested process is pertaining to the stored text, and image size data. In the conventional image processing controller 201 that carries out image processing control only for the copying operation, because the translated stored-text data 708 does not exist, the process data is treated as the data input from the operating unit 301 in the detailed-information conversion controller 505 (see FIGS. 5 and 6).

However, in the present embodiment, the image size data changes depending on whether the requested process is the copying operation or the operation to output the stored text. Moreover, if the requested process is the operation to output the stored text, the image size data gets included in the related data of the stored images from the stored text-data controller 303 and is controlled by the stored text data (internal variable) controller 503 (see FIGS. 5 and 6). The image size data gets included as one of the items in the download settings that are set by the image processing controller 201, and is used to notify a line that includes the image for image processing to the image processing device 203.

Figure 14:
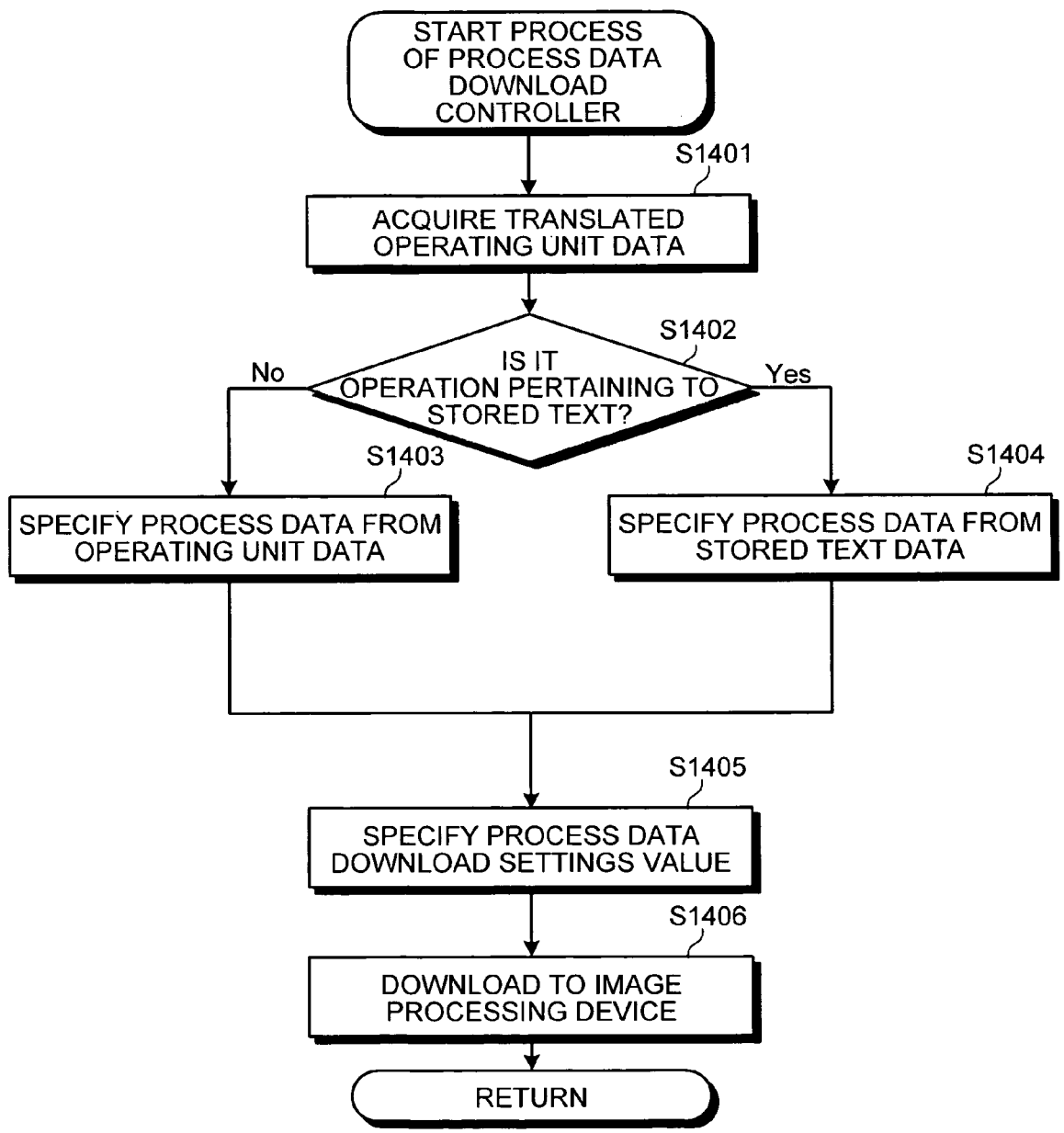
FIG. 14 is a flowchart of a control procedure performed by a process-data download controller shown in FIG. 13.

FIG. 14 is a flowchart of a control procedure to specify the process data based on whether the requested process is an operation pertaining to the stored text. The process-data download controller 1303 controls the flow.

As shown in FIG. 14, the process-data download controller 1303 acquires the translated operating-unit data 707 (step S1401). Next, the process-data download controller 1303 determines valid data to specify process data download settings such as the image size data. In other words, based on the application data, which is the process data included in the translated operating-unit data 707, the process-data download controller 1303 determines whether the requested process is an operation pertaining to the stored text (step S1402). If the requested process is an operation pertaining to the stored text ("Yes" at step S1402), the process-data download controller 1303 considers the translated stored-text data 708 as the valid data and specifies the process data (step S1404). If the requested process is not an operation pertaining to the stored text ("No" at step S1402), the process-data download controller 1303 considers the translated operating-unit data 707 as the valid data, specifies the process data (step S1403), switches reference data to select download settings values such as the image size data (step S1405), and carries out downloading to the image processing device 203 (step S1406).

A method to determine the program and the data for downloading by means of computation from the detailed information is explained as an execution level structure that is applicable to the download request controller 506 in the image processing system according to the embodiment.

FIG. 15 is an example of γ data that is used for digitization of image data. In the example shown in FIG. 15, a threshold value of digitization is assigned as the data from the operating unit 301 to carry out digitization of the image data by using γ data in control request specification. Based on digitization threshold value data, the download request controller 506 refers to the reference table shown in FIG. 15, refers to a γ data table indicated by a digitization number, and downloads the program and the data to the image processing devices 203, thereby enabling to carry out image processing control according to the control request specifications with the aid of the download control. However, because of the large size of the γ data (256 entries in unsigned.char data), storing the γ data as table data having 256 entries consumes a large amount of Read Only Memory (ROM).

A method to minimize the required amount of memory is explained next. FIG. 16 is an example of a computation method according to the present embodiment that is used by the image-processing download controller 1301 to select the γ data.

In the example shown in FIG. 16, the entire data for downloading is not acquired by referring to the table cluster 1302. Data for temporary downloading is created in a Random Access Memory (RAM) by means of computation and downloaded.

As shown in (A), GamTbl [256] (unsigned.char) is provided as a γ table for temporary storing of data. As shown in (B), settings values are stored in GamTbl [256] by means of comparing a γ arithmetic expression with digitization threshold value data Thr. Compared to the table control method shown in FIG. 15 that always uses the γ data having 256 entries, in the computation method shown in FIG. 16, only the amount of memory for temporarily storing one entry of the γ data needs to be secured. Thus, the amount of memory required for storing the γ data is minimized by 256 times. Moreover, after completion of control in the mono process, even the memory that stores one entry of the γ data is released and can be used for other processes.

Thus, by calculating settings values by means of computation and downloading with the aid of temporarily created values, the necessity to store all the settings values in the ROM is removed and the amount of memory can be compressed in comparison to the table reference method that stores the setting values in a table format in the ROM and carries out downloading by referring to the values from the reference table.

In the example of γ data computation, the image processing controller 201 itself carries out computation to select download settings values. However, methods to select download settings values by means of computation can also be used for various control parameters such as color correction. Merits of the computation method can be increased further by using the computation method to select and download settings values of magnification control data when carrying out a three dimensional convolution instead of storing the settings values beforehand in the image processing controller 201.

The related data of the text stored in the stored text-data controller 303 is explained next. The related data of the text stored in the stored text-data controller 303 includes color data (Red Blue Green (RGB), Cyan Magenta Yellow Key (CMYK) etc.), manuscript mode, resolution, number of tones, start and discontinuation of a separation process according to type of image, start and discontinuation of a digital Acoustic Emission (AE) process, image size, application data and stored data pertaining to types of devices. The related data of the text stored in the stored text-data controller 303 ensures that the image quality is not deteriorated during output of the stored text.

If the operation to output the stored text is specified, the related data of the text stored in the stored text-data controller 303 is translated into internal variables by the interface protocol controller 502, and can be used during the operation pertaining to the stored text. Accordingly, the related data of the stored images such as the color data (RGB, CMYK etc.), the manuscript mode, the resolution, the number of tones, start and discontinuation of the separation process according to type of image, start and discontinuation of the digital AE process, the image size, the application data and the stored data pertaining to types of devices is also required to be stored as much as possible in the stored text-data controller 303 provided in an external storage device to preserve the image quality of the stored text during reuse.

As explained with reference to FIG. 7, because the interface protocol controller 502 can translate the entire data if the data is included as the related data of the text stored in the stored text-data controller 303, the data becomes control parameters of the image processing controller 201.

If the data is translated as the translated stored-text data 708, each of the detailed information converters 801 for the respective image processing can use the translated stored-text data 708 to refer to the reference table shown in FIG. 10, having dimensions consisting of the request levels of the operating unit 301 and the stored text data, and convert the translated stored-text data 708 to the detailed information 803 for the respective image processing (see FIG. 8).

Increase in the amount of the translated stored-text data 708 that functions as the control parameters does not change the reference structure of the translated stored-text data 708. Although there is an increase in the dimensions and the amount of memory of the reference table shown in FIG. 10, the image processing controller 201 can refer to the reference table that has become multidimensional by simply modifying a line (or several lines) of the control structure that refers to the reference table, and convert the translated stored-text data 708 to the detailed information 803.

In the example the translated operating-unit data 707 and the translated stored-text data 708 are used as control parameters to directly refer to the reference table. However, as shown in FIG. 16, the computation method that selects a new value by computing the translated operating-unit data 707 and the translated stored-text data 708 and uses the new value to refer to the reference table can also be used.

FIG. 17 is an example of a reference table having dimensions consisting of the request levels of the operating unit 301 and values that are computed from the request levels of the operating unit 301 and the stored text data. A value of [A] in a second dimension of the reference table shown in (B) corresponds to a value shown in (A). The value of A is selected based on the data pertaining to magnification percentage in the translated operating-unit data 707 and the translated stored-text data 708 ("magnification percentage data of operating unit/magnification percentage data of stored text" in the example shown in (A). In the example shown in FIG. 17, the value of [A] is used as a control parameter to refer to the reference table.

Figure 18:
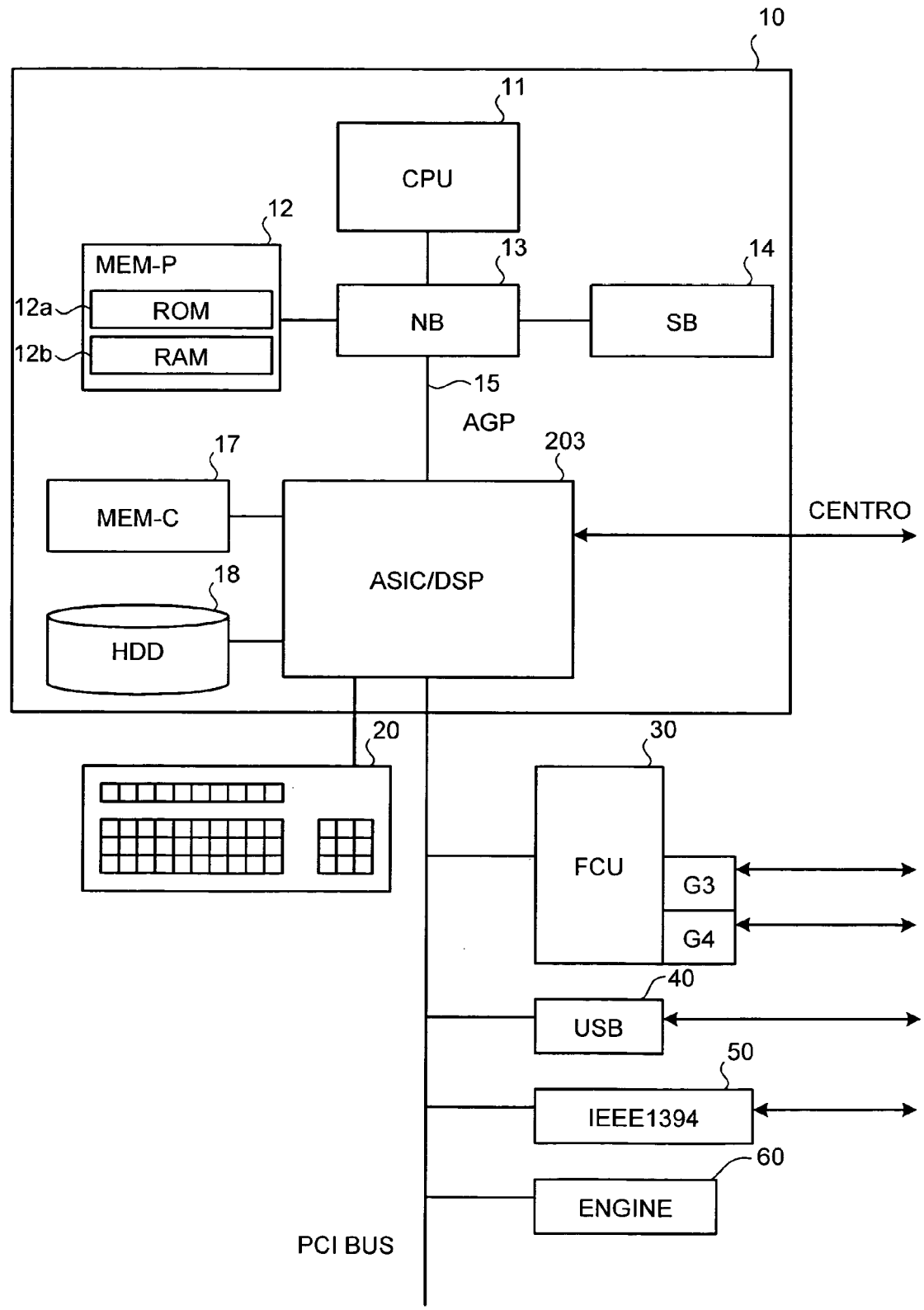
FIG. 18 is a block diagram of a hardware structure of an image processor according to the embodiment.

Accordingly, related data of previously read image data or image data transmitted via a network can be stored, and the stored related data can be used to select a program and data for downloading to the image processing devices, thereby performing image processing according to the type of image data and outputting a high quality image. FIG. 18 is a block diagram of hardware structure of an image processor 100 according to the embodiment. As shown in FIG. 18, the image processor 100 includes a controller 10 and an engine 60 connected by means of a Peripheral Component Interconnect (PCI) bus. The controller 10 controls the entire image processor 100 and controls imaging, communication, and input from an operating unit 20. The engine 60 is a printer engine such as a black and white plotter, a single drum color plotter, a 4-drum color plotter, or a scanner connectable to the PCI bus. The engine 60 also includes an image processing unit such as an error diffuser or a gamma converter in addition to an engine unit such as plotter.

The controller 10 includes a Central Processing Unit (CPU) 11, a North Bridge (NB) 13, a system memory (MEM-P) 12, a South Bridge (SB) 14, a local memory (MEM-C) 17, an ASIC or a DSP 203, and a Hard Disk Drive (HDD) 18. The NB 13 and the ASIC/DSP 203 are connected by means of an Accelerated Graphics Port (AGP) bus 15. The MEM-P 12 further includes a ROM 12a and a RAM 12b.

The CPU 11 controls the entire image processor 100 and includes a chipset consisting of the NB 13, the MEM-P 12, and the SB 14. The CPU 11 is connected to other devices via the chipset.

The NB 13 is a bridge that connects the CPU 11 with the MEM-P 12, the SB 14, and the AGP bus 15. The NB 13 includes a memory controller that controls read/write operations on the MEM-P 12, a PCI master and an AGP target.

The MEM-P 12 is a system memory that can be used as a memory to store a program or data, a memory for expansion of a program or data, or a memory for printer imaging. The MEM-P 12 includes the ROM 12a and the RAM 12b. The ROM 12a is a read only memory that is used for storing a program or data. The RAM 12b is a writable and readable memory that is used for expansion of a program or data, or for printer imaging.

The SB 14 is a bridge for connecting the NB 13 with PCI devices and surrounding devices. The SB 14 is connected to the NB 13 via the PCI bus. A network interface unit is also connected to the PCI bus.

The ASIC/DSP 203 is an image processing specific integrated circuit that includes hardware components for image processing and functions as a bridge to connect the AGP bus 15, the PCI bus, the HDD 18, and the MEM-C 17. The ASIC/DSP 203 includes a PCI target, an AGP master, an arbiter (ARB) that forms the core of the ASIC/DSP 203, a memory controller that controls the MEM-C 17, multiple Direct Memory Access Controllers (DMAC) that carry out rotation of image data by means of hardware logic etc., and a PCI unit that transmits data between the ASIC/DSP 203 and the engine 60 via the PCI bus. A FAX Control Unit (FCU) 30, a Universal Serial Bus (USB) 40, and an Institute of Electrical and Electronics Engineers 1394 (IEEE 1394) interface 50 are also connected to the ASIC/DSP 203 via the PCI bus.

The MEM-C 17 is a local memory that is used as an image buffer and a code buffer for copying. The HDD 18 is storage that stores image data, programs, font data, and forms.

The AGP bus 15 is a bus interface for a graphics accelerator card that is used to enhance the speed of graphic process. The AGP bus 15 directly accesses the MEM-P 12 with high throughput, thereby enhancing the speed of the graphics accelerator card.

An image processing program that is executed by the image processor according to the embodiment is embedded beforehand in the ROM etc. and provided.

The image processing program executed by the image processor according to the present embodiment can be recorded in the form of an installable or executable file in a computer readable recording medium such as a Compact Disk Read Only Memory (CD-ROM), a Flexible Disk (FD), a Compact Disk-Recordable (CD-R), a Digital Versatile Disk (DVD) etc. and provided.

The image processing program executed by the image processor according to the present embodiment can also be stored in a computer that is connected to a network such as the Internet and downloaded via the network. The image processing program executed by the image processor according to the embodiment can also be provided or distributed via the network such as the Internet.

The image processing program executed by the image processor according to the embodiment consists of modules that include each of the units (the mono process request controller, the interface protocol controller, the stored text data (internal variable) controller, the resource and service controller, the detailed information conversion controller, the download request controller etc.). In hardware form, the image processing program is read by the CPU (processor) from the ROM and executed. Due to this, each of the units such as the mono process request controller, the interface protocol controller, the stored text data (internal variable) controller, the resource and service controller, the detailed information conversion controller, the download request controller etc. are loaded and generated on a main memory device.

According to the present invention, a wide variety of image processing parameters can be selected for various types of stored text, so that high quality images can be output regardless of the type of image data stored.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processor comprising:
  a user operable operating unit for inputting instructions to the image processor;
  a storing unit that stores related data for image data stored in the image processor;
  a plurality of image processing devices, operably connected to the operating unit, that individually perform image processing, the plurality of image processing devices being mounted within the image processor;
  a single image processing controller configured to control downloading information corresponding to a program and data needed for image processing based on property data attached to the image data received from the operating unit and the related data read from the storing unit, the single image processing controller being further configured to control communication and input from the operating unit, the single image processing controller being mounted within the image processor;
  a translating unit that translates the related data to internal data;
  a converting unit that converts the internal data to information corresponding to the program and the data used for image processing; and
  a downloading unit that downloads the information corresponding to the program and the data to the image processing devices, wherein
  the image processing devices are configured to perform the image processing based on downloaded information and, wherein the single image processing controller is configured to control image processing by determining whether a process request can be executed using only the data from the operating unit or whether the related data from the storing unit is also required.

2. The image processor according to claim 1, wherein the downloading unit downloads the information to the image processing devices based on system information indicating types and number of the image processing devices.

3. The image processor according to claim 1, further comprising a reference-table storing unit that stores a reference table,
  wherein the converting unit converts the internal data to the information by referring to the reference table.

4. The image processor according to claim 1, wherein the converting unit converts the internal data into the information by computation.

5. The image processor according to claim 1, further comprising a storage area corresponding to each of the image processing devices provided in the converting unit,
  wherein the information is stored in storage areas corresponding to each of the image processing devices.

6. The image processor according to claim 1, further comprising
  an acquiring unit that acquires operation data set for outputting the image data, wherein
  the translating unit further translates the operation data to operation internal data, and
  the converting unit converts the internal data to information based on the internal data and the operation internal data.

7. The image processor according to claim 6, wherein the translating unit translates only the operation data to operation internal data if the related data does not exist.

8. The image processor according to claim 1, wherein the related data includes at least one of color data, a manuscript mode, resolution, number of tones, start and discontinuation of a separation process, start and discontinuation of a digital Acoustic Emission (AE) process, an image size, application data, or data pertaining to a type of an image reader.

9. The image processor according to claim 1, wherein at least one of the plurality of image processing devices is a Digital Signal Processor (DSP).

10. A method performed by an image processor, comprising:
  acquiring operation setting data from an operation input unit;
  performing image processor resource control in response to the operation setting data;
  storing related data set for image data stored in a storing unit in the image processor;
  establishing services to be performed by a plurality of image processing devices mounted within the image processor based on property data attached with image data read from the operation input unit and the related data received from the storing unit;
  translating the related data to internal data;
  converting the internal data to information corresponding to a program and data used for the image processing; and
  downloading the information corresponding to the program and the data to the plurality of image processing devices mounted within the image processor that individually perform image processing based on the property data attached to the image data, wherein
  the image processing devices perform the image processing based on downloaded information and, wherein establishing services to be performed by the plurality of image processing devices includes determining whether a process request can be executed using only the data from the operation input unit or whether the related data from the storing unit is also required.

11. A computer-readable recording medium that stores therein a computer program that causes a computer to function as an image processor, the computer program causing the image processor to execute:
  acquiring operation setting data from an operation input unit;
  performing image processor resource control in response to the operation setting data;
  storing related data set for image data stored in a storing unit in the image processor;
  establishing services to be performed by a plurality of image processing devices mounted within the image processor based on property data attached with the image data read from the operation input unit and the related data received from the storing unit;
translating the related data to internal data;
converting the internal data to information corresponding to a program and data used for the image processing; and
downloading the information corresponding to the program and the data to the plurality of image processing devices, mounted within the image processor, that individually perform the image processing based on the property data attached to the image data, wherein the image processing devices perform the image processing based on downloaded information and, wherein establishing services to be performed by the plurality of image processing devices includes determining whether a process request can be executed using only the data from the operation input unit or whether the related data from the storing unit is also required.

* * * * *